(12) United States Patent
Boespflug et al.

(10) Patent No.: US 9,162,754 B2
(45) Date of Patent: Oct. 20, 2015

(54) METHOD OF USING AN ACTIVE FLOW CONTROL SYSTEM FOR LIFT ENHANCEMENT OR DESTRUCTION IN A WIND TURBINE BLADE

(75) Inventors: Matthew Patrick Boespflug, Schenectady, NY (US); Seyed Gholamali Saddoughi, Clifton Park, NY (US); Grover Andrew Bennett, Jr., Schenectady, NY (US); Dmytro Floriyovych Opaits, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 594 days.

(21) Appl. No.: 13/457,872

(22) Filed: Apr. 27, 2012

(65) Prior Publication Data

US 2013/0284273 A1 Oct. 31, 2013

(51) Int. Cl.
*B64C 21/08* (2006.01)
*B64C 21/04* (2006.01)
(Continued)

(52) U.S. Cl.
CPC .............. *B64C 21/08* (2013.01); *B64C 21/04* (2013.01); *F01D 5/145* (2013.01); *F03D 1/0683* (2013.01); *F03D 7/022* (2013.01); *B64C 2230/04* (2013.01); *B64C 2230/06* (2013.01); *F05B 2240/122* (2013.01); *F05D 2270/17* (2013.01); *Y02E 10/721* (2013.01); *Y02E 10/723* (2013.01); *Y02T 50/166* (2013.01); *Y02T 50/673* (2013.01); *Y10T 137/0391* (2015.04)

(58) Field of Classification Search
CPC .................... Y02T 50/166; B64C 2700/6271; B64C 21/02; B64C 21/025; B64C 21/04; B64C 21/06; B64C 21/08; B64C 2230/04; B64C 2230/06; B64C 2230/08; F01D 5/145
USPC ......................................................... 244/207
See application file for complete search history.

(56) References Cited

U.S. PATENT DOCUMENTS 2,896,881 A * 7/1959 Attinello ........................ 244/207
5,755,408 A 5/1998 Schmidt et al.
(Continued)

FOREIGN PATENT DOCUMENTS

GB 1600454 A 10/1981
WO 2011077424 A1 6/2011

OTHER PUBLICATIONS

Search Report and Written Opinion from corresponding PCT Application No. PCT/US2013/038184 dated Aug. 2, 2013.
(Continued)

*Primary Examiner* — Brian M O'Hara
(74) *Attorney, Agent, or Firm* — Francis T. Coppa (57) ABSTRACT

A method for actively manipulating a primary fluid flow over a surface using an active flow control system including an active fluid flow device to provide lift enhancement and lift destruction. The method including the disposing of an active fluid flow device in the surface. The active fluid flow device is then operated to generate at least one of a steady blowing secondary fluid flow, a pulsed secondary fluid flow or an oscillating secondary fluid flow. While flowing the primary fluid over the surface to create a primary flow field, a secondary fluid flow is injected in an upstream direction and substantially opposed to the incoming primary fluid flow. The injecting of the secondary fluid flow in this manner provides for influencing of the primary flow field by manipulating a momentum of the secondary fluid flow to influence the incoming primary fluid flow and resultant lift.

20 Claims, 7 Drawing Sheets

FIG. 3

(51) Int. Cl.
  *F03D 7/02* (2006.01)
  *F01D 5/14* (2006.01)
  *F03D 1/06* (2006.01)

(56) References Cited

U.S. PATENT DOCUMENTS

| | | | |
|---|---|---|---|
| 5,938,404 A * | 8/1999 | Domzalski et al. | 416/91 |
| 6,234,751 B1 | 5/2001 | Hassan et al. | |
| 6,412,732 B1 | 7/2002 | Amitay et al. | |
| 6,722,581 B2 | 4/2004 | Saddoughi | |
| 7,387,491 B2 | 6/2008 | Saddoughi et al. | |
| 7,635,107 B2 | 12/2009 | Shmilovich et al. | |
| 7,686,257 B2 | 3/2010 | Saddoughi et al. | |
| 7,748,664 B2 * | 7/2010 | Boespflug et al. | 244/208 |
| 7,823,839 B2 | 11/2010 | Glezer et al. | |
| 7,874,525 B2 * | 1/2011 | Miller et al. | 244/207 |
| 7,967,258 B2 | 6/2011 | Smith et al. | |
| 8,033,510 B2 | 10/2011 | Shmilovich et al. | |
| 8,382,043 B1 * | 2/2013 | Raghu | 244/207 |
| 2009/0308980 A1 * | 12/2009 | Miller et al. | 244/207 |
| 2010/0104436 A1 | 4/2010 | Herr et al. | |
| 2011/0206506 A1 | 8/2011 | Nies et al. | |
| 2011/0309201 A1 * | 12/2011 | Hassan et al. | 244/207 |
| 2013/0022464 A1 * | 1/2013 | Dixon et al. | 416/1 |

OTHER PUBLICATIONS

Mitay et al., "Aerodynamic Flow Control Over an Unconventional Airfoil Using Synthetic Jet Actuators", AIAA Journal, vol. 39, Issue 3, pp. 361-370, 2001.

Lee et al., "Modeling of an IPMC Actuator-driven Zero-Net-Mass-Flux Pump for Flow Control", Journal of Intelligent Material Systems and Structures, vol. 17, Issue 6, pp. 533-541, Jun. 2006.

Cattafesta III et al., "Actuators for Active Flow Control", Annual Review of Fluid Mechanics, vol. 43, pp. 247-272, Jan. 2011.

\* cited by examiner

METHOD OF USING AN ACTIVE FLOW CONTROL SYSTEM FOR LIFT ENHANCEMENT OR DESTRUCTION IN A WIND TURBINE BLADE

BACKGROUND

The disclosure relates generally to manipulation of fluid flows using an active flow control system and more particularly, a method for using an active flow control system to achieve both lift enhancement and destruction.

An airfoil-shaped body moved through a fluid produces a force perpendicular to the motion called lift. Subsonic flight airfoils have a characteristic shape with a rounded leading edge, followed by a sharp trailing edge, often with asymmetric camber. A fixed-wing aircraft's wings, horizontal, and vertical stabilizers are built with airfoil-shaped cross sections, as are helicopter rotor blades. Airfoils are also found in propellers, fans, compressors and turbines. Of concern is active circulation control of these aerodynamic structures. More specifically, of concern is the utilization of active circulation control for aerodynamic structures, such as a wind turbine blade or a gas turbine blade, to achieve both lift enhancement and destruction dependent upon need, as compared to the same blade without active circulation control.

Airfoil circulation control typically uses fluid injection in the form of a secondary fluid flow to create a steady wall-jet at the proximity of a rounded surface in a blade to leverage the Coandã effect. The Coandã effect can be defined as the effect by which a fluid jet attaches itself to an adjacent surface, such as an airfoil, and remains attached. Circulation control may result in increased lift and systems using this principle have been conceptualized for a wide variety of applications from aircraft wings to wind turbines. In aircraft wings applications, the circulation control may work by increasing the velocity of the airflow over the leading edge and trailing edge of a specially designed aircraft wing using a series of blowing slots that eject high pressure jet air tangentially as the secondary fluid flow, in a substantially downstream direction as relates to the incoming primary fluid flow. The wing has a rounded trailing edge to tangentially eject the air through the Coandã effect, thus causing lift. The increase in velocity of the airflow over the wing may also add to the lift force through conventional airfoil lift production. In other systems, the injection of the secondary fluid flow creates or enhances separation over the aerodynamic surface for lift destruction by creating a flow disturbance on or near the aerodynamic surface. As described, a method that can accomplish both lift destruction and lift enhancement in a single active system does not exist.

Since their conception, airfoils have suffered the risk of stall, or loss of lift, due to flow separation over the surface. In particular, it is known that airfoils at high angles of attack are at risk of the incoming primary flow separating from the surface of the airfoil, causing loss of lift. In addition, newer airfoils used for energy capture may suffer damage due to increased lift in unexpected high flow conditions. Furthermore, blade-to-tower clearances in wind turbines are of concern as a result of aerodynamic loading on the blades causing them to bend toward the tower. Stiffer, and thus more expensive, blades may be required to avoid collision with the tower. By reducing the aerodynamic load on the blade as it is passing in front of the tower, the risk of blade-to-tower collision would be minimized, if not eliminated. In addition, improving lift when the blade is not passing in front of the tower may provide increased energy production.

It is therefore desirable to achieve circulation control around an aerodynamic structure, such as in airfoils at high angles of attack, to provide lift destruction in unexpected high flow conditions, as a result of flow blockage over the surface of the airfoil, or alternatively increase lift producing capability, as a result of flow separation over the surface of the airfoil to minimize the risk of stall. It is additionally desirable to provide such a system configured to provide both lift enhancement and destruction, dependent upon need and current conditions, but to do so at a reduced system cost. More specifically, it is desirable to provide a blade, such as for using in wind turbines, turbomachinery, aerospace vehicles, and the like, that is optimized or designed to provide a single active system that provides better load-bearing performance than other currently commercially available streamlined aerodynamic profiles. Therefore, there is a need for an improved airfoil active flow control method that address one or more of the aforementioned issues.

BRIEF DESCRIPTION

In accordance with an embodiment, a method of manipulating a primary fluid flow over a surface is provided. The method includes disposing an active fluid flow device in the surface; operating the active fluid flow device to generate at least one of a steady blowing secondary fluid flow, a pulsed secondary fluid flow or an oscillating secondary fluid flow; flowing the primary fluid over the surface to create a primary flow field; injecting the secondary fluid flow in a substantially upstream direction and in a direction substantially opposed to a direction of the primary fluid flow; and influencing the primary flow field by manipulating a momentum of the secondary fluid flow to influence the incoming primary fluid flow and resultant lift.

In accordance with another embodiment, a method of operating an active flow control system operable to manipulate a primary fluid flow over an aerodynamic surface is provided. The method includes disposing at least one active flow device located substantially downstream of a primary fluid flow over the aerodynamic surface and operable to introduce at least one secondary flow in the near wall boundary layer; operating the active fluid flow device to generate at least one of a steady blowing secondary fluid flow, a pulsed secondary fluid flow or an oscillating secondary fluid flow at an opening in the aerodynamic surface; flowing the primary fluid over the aerodynamic surface to create a primary flow field; injecting the secondary fluid flow in a substantially upstream direction and in a direction substantially opposed to a direction of the primary fluid flow; and influencing the primary flow field by manipulating a momentum of the secondary fluid flow to influence the incoming primary fluid flow and resultant lift.

In accordance with another embodiment, a method of operating an active flow control system operable to manipulate a primary fluid flow over an airfoil surface is provided. The method includes disposing at least one active flow device located substantially downstream of a primary fluid flow over the airfoil surface and operable to introduce at least one secondary flow in the near wall boundary layer; operating the active fluid flow device to generate at least one of a steady blowing secondary fluid flow, a pulsed secondary fluid flow or an oscillating secondary fluid flow at an opening in the airfoil surface; flowing the primary fluid over the airfoil surface to create a primary flow field; injecting the secondary fluid flow in a substantially upstream direction and in a direction substantially opposed to a direction of the primary fluid flow; and influencing the primary flow field by adjusting operating parameters including voltage and frequency of the active fluid flow device thereby manipulating a momentum of the secondary fluid flow to influence the incoming primary fluid flow and resultant lift enhancement or lift destruction.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

Preferred embodiments of the present disclosure are illustrated in the figures like numerals being used to refer to like and corresponding parts of the various drawings. It is also understood that terms such as "top", "bottom", "outward", "inward", and the like are words of convenience and are not to be construed as limiting terms. It is to be noted that the terms "first," "second," and the like, as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity).

A "blade" as defined herein is a three-dimensional structure that lies in a fluid flow field and applies to a variety of devices, such as blades of wind turbines, gas turbines or aircraft engines, wings and pylons in aircraft, rotors of helicopters, and the like. Trailing edge "and/or" leading edge as defined herein implies the trailing edge, the leading edge, or both the trailing edge and the leading edge. In one embodiment, the trailing edge and the leading edge are rounded (i.e., with a finite radii of curvature). As used herein, "unsteady" is defined as a signal that varies with time the frequency and/or amplitude of the actuator in the active flow control device.

In the present disclosure an active flow control system for circulation control utilizes an upstream fluid injection as a secondary fluid flow. The upstream fluid injection leverages a flow blockage to the incoming primary air flow Coandã effect, as described herein, or improves mixing of the high momentum freestream flow with a low momentum secondary flow, as described herein, thus providing airfoil lift enhancement or lift destruction dependent upon operation settings, such as voltage, frequency, etc.

Figure 1:
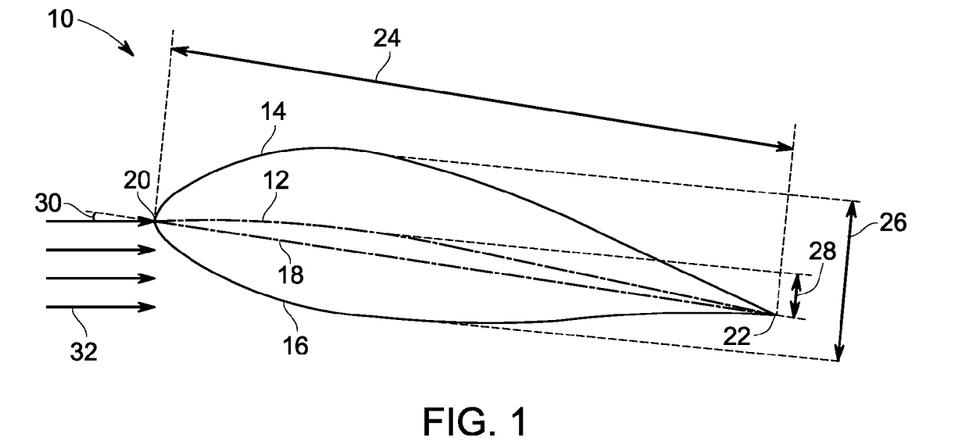
FIG. 1 is a description of various known physical parameters of a conventional airfoil.

Referring now to FIG. 1, an airfoil or aerofoil 10 is illustrated, showing the shape of a wing or blade (of a propeller, rotor or turbine) or sail as seen in cross-section. Some terminology associated with the airfoil 10 will be described presently. A mean camber line 12 of the airfoil 10 is a line drawn midway between an upper surface 14 and a lower surface 16. A chord line 18 is a straight line connecting a leading edge 20 and a trailing edge 22 of the airfoil 10, at the ends of the mean camber line 12. A chord length 24 is the length of the chord line 18 and is the characteristic dimension of the airfoil section. A maximum thickness 26 and the location of maximum thickness are usually expressed as a percentage of the chord length 24. Similarly, a maximum camber 28 and the location of the maximum camber are usually expressed as a percentage of the chord length 24. For symmetrical airfoils, both the mean camber line 12 and the chord line 18 pass from a center of gravity of the airfoil 10 and touch at the leading edge 20 and the trailing edge 12 of the airfoil 10. An aerodynamic center is the chord wise length about which the pitching moment is independent of a lift coefficient and an angle of attack 30, which is the angle between the chord line 18 and the vector representing the relative motion between the airfoil 10 and the incoming primary air flow 32 (indicated by the arrows). A center of pressure is the chord wise location about which the pitching moment is zero.

Figure 2:
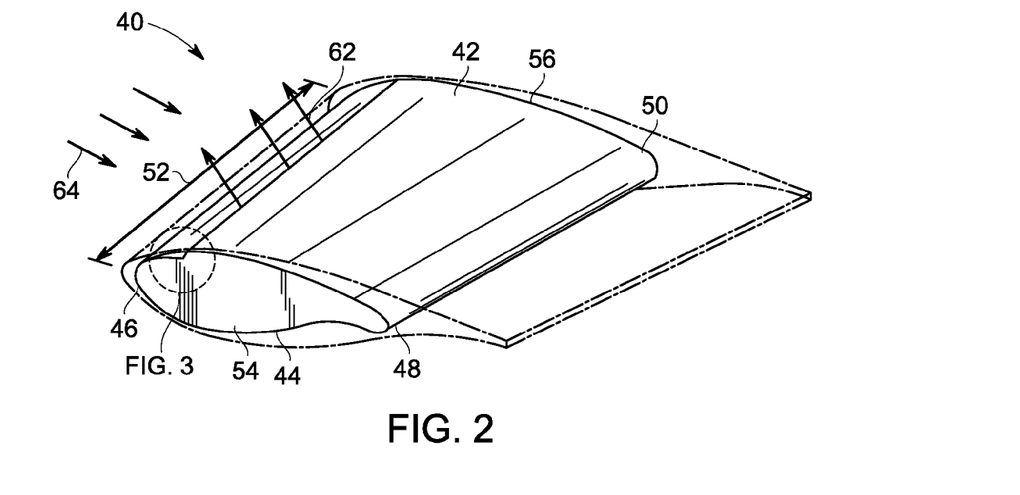
FIG. 2 is a perspective view of a portion of a blade that includes a plurality of active flow control devices of an active flow control system according to an exemplary embodiment.
Figure 3:
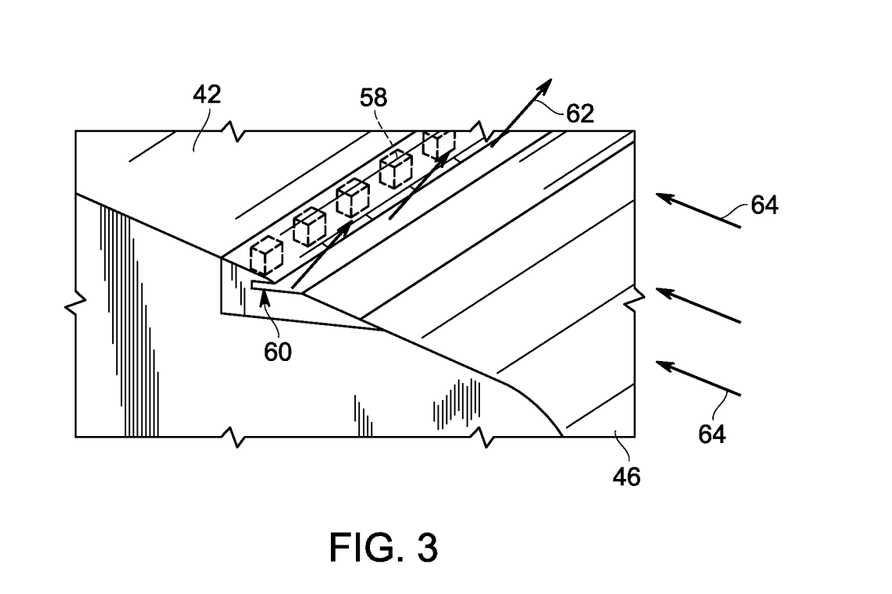
FIG. 3 is an enlarged view of the blade with the active flow control devices of FIG. 2.

Referring now to FIGS. 2 and 3, an aerodynamic structure 40, such as a blade, airfoil, and the like, with an active flow control system is generally shown according to an embodiment. As used herein, active flow control is a technique in which, at least one of an oscillatory, pulsed or steady air flow of a chosen frequency and strength is blown, or injected, in a substantially upstream direction toward an incoming primary air flow to provide lift enhancement and lift destruction dependent upon operation settings. More particularly, in an embodiment at least one of an oscillatory, pulsed or steady air flow of a chosen frequency and strength is blown, or injected, in a direction that is opposed to the direction of the incoming primary air flow. In an embodiment, the injected oscillatory, pulsed or steady air flow is injected within a range of a substantially tangentially upstream direction to a substantially perpendicular direction to the direction of the incoming primary air flow. In one instance, a momentum addition (and consequent vorticity production) combines with the acceleration of the fluid around the injected secondary flow (similar to the Coandã effect with a steady jet) to provide an instantaneous lift increase when the momentum is high enough to ensure that the impact of the energizing jets of fluid flow provide an overall lift increase. In another instance, a momentum addition (and consequent vorticity production) acts as a flow blockage to provide an instantaneous destruction of lift when the momentum is high enough to ensure that the impact of the energizing jets of fluid flow provide an overall destruction in lift.

Lift enhancement or destruction is provided by modifying the aerodynamic behavior of the blade by using a steady flow via a steady blowing air flow source or via a pulsed or oscillatory flow by zero-net mass flow active flow control actuators (like synthetic jets, plasma actuators etc.).

As previously stated, airfoils at high angles of attack are at risk of the flow separating from the surface causing loss of lift. A secondary flow injection from the active flow control devices disclosed herein may be directed at specific angles towards an incoming primary flow and thus may be used to achieve lift enhancement by mixing the high momentum free stream flow with the secondary flow. In addition, the secondary flow injection from the active flow control devices disclosed herein may be used to create or enhance separation for lift destruction by creating a flow blockage on or near the aerodynamic surface. The active flow control device may be used to achieve either goal by adjusting operating parameters, and thus momentum, of the secondary flow injection. Accordingly, the flow control device disclosed herein is an active system that can be turned manipulated, such as by turning "on" or "off", as needed to mitigate both risk of stall, or loss of lift, due to flow separation over the aerodynamic surfaces, or damage due to increased lift in unexpected high flow conditions.

Referring again to FIGS. 2 and 3, in general, the airfoil 40 includes an upper surface 42, a lower surface 44, a leading edge 46 and a trailing edge 48. In an embodiment, the upper surface 42 of the airfoil 40 includes a housing 50 that substantially extends an entire length 52 between a first end surface 54 and a second end surface 56 of the airfoil 10. Alternatively, the upper surface 12 may include a plurality of housings that each partially extend between the end surfaces 54, 56, instead of a single housing 50 that extends across the entire length 52 of the airfoil 40.

One or more active flow control devices 58 (shown in phantom in FIG. 3) are disposed within the housing 50 or surface. The active flow control devices 58 can be disposed along the entire length 52 of the blade 40, or alternatively along only a small section of the blade 40. In the illustrated embodiment, the active flow control devices 58 are disposed proximate to the leading edge 46 of the blade 40 such that a pulsed, oscillatory or steady jet of fluid 62 emitted from the active flow control device 58 flows through an opening 60 in the surface, and more particularly the housing 50, in an upstream direction (as indicated by arrows) to an incoming primary air flow 64 (indicated by arrows) to produce lift enhancement or destruction. In an embodiment, the active flow control device 42 is configured proximate the upper surface 42 and in an upstream half of the airfoil 14. More specifically, in an embodiment, the opening 60 may be disposed at a distance of up to about 50% of the length of the chord 24 (at a given point on the blade), from the leading edge at that point on the blade. In an embodiment, the opening 60 may be disposed at a distance of about 33% of the length of the chord 24, from the leading edge at that point on the blade, and configured to inject a pulsed, oscillatory or steady jet of fluid in an upstream direction and more particularly, in a direction approximately 45-degrees to the direction of the incoming primary fluid flow.

The opening 60 can have any desired length. For example, the opening 60 can have dimensions to accommodate only a single active flow control device 58, or can have a dimension that extends along the entire length of the housing 50 in which multiple active flow control devices 58 can be used to produce a series of wall-jets emitted through the opening 50. The multiple active flow control devices 58 can also be operated synchronously or non-synchronously with designed phase differences, if desired.

Examples of such active flow control devices 58 include zero-mass actuators like plasma actuators and piezoelectric synthetic jets. One specific example of the latter being dual bimorph synthetic jet (DBSJ) devices. DBSJ devices are desirable because such devices have low power consumption, low weight penalties, large control authority (jet strength), good frequency and amplitude range, compactness, and therefore permit ease of integration within the blade. In the case of DBSJ device, the injector attached to DBSJ should preferably have converging nozzle shape to provide diffusion on the oscillatory back stroke of the DBSJ. The aforementioned characteristics are of particular use in blades used in wind turbines. In other embodiments, the active flow control device devices 58 may be configured to modify the fluid flow using methods other than the synthetic jets, such as through the use of non-zero mass flow actuators that need a source of pressurized air or fluid, such as fluidic oscillators and flip-flop jets that provide pulsed velocity jets. In yet another embodiment, the active flow control device devices 58 may be configured as steady blowing jets. When the active flow control device 58 is disposed in the housing 50 proximate to the leading edge 46, active circulation control is effected by virtue of the addition of either a large component of momentum substantially disruptive to the incoming primary fluid flow 64 proximate the airfoil 14 to destroy lift, or a small component of momentum substantially mixing with the incoming primary fluid flow 64 proximate the airfoil 14 to enhance lift and provide stall extension.

Figure 4:
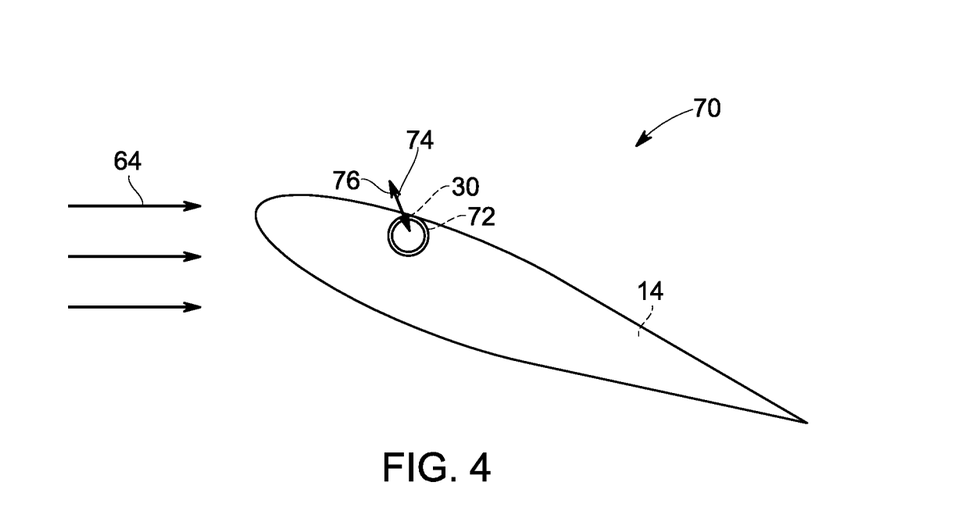
FIG. 4 is a cross-sectional view of a blade including an active flow control system for providing an oscillatory jet flow as a secondary fluid flow according to an exemplary embodiment.

In an exemplary embodiment of a blade design 70, and as illustrated in schematic cross-section in FIG. 4, the active flow control device 58 may be a synthetic jet active flow control device, such as a dual bimorph synthetic jet actuator (DBSJ) 72 and an oscillatory jet 74 that provides an oscillatory jet of fluid 76 into the main incoming primary air flow 64 for the active circulation control of the blade 14. Synthetic jets generally comprise a flexible diaphragm incorporated into a synthetic jet housing. When the diaphragm vibrates, the internal volume of the synthetic jet housing changes, causing air to flow into, within, and out of the synthetic jet housing. Changing the internal volume of the synthetic jet housing activates the wall-jet and provides the oscillatory jet of fluid 76 through the opening 30 as a secondary fluid flow, similar to secondary fluid flow 62 previously described. Various means can be used to activate the diaphragm of the synthetic jet 72. In one embodiment, a battery (not shown) can be used to activate the diaphragm. Other means of actuating the synthetic jet 70 include a piezoelectric transducer, a waveform/sinusoidal drive transducer, a thermostatic actuator, a thermoelectrical actuator, a thermopneumatic actuator, a shape memory alloy, a magnetic method, or any other drive or actuator used in conjunction with a diaphragm piston, or any other movable structure that can be incorporated into the housing 24. Synthetic jets are disclosed in U.S. Pat. No. 6,722,581 and U.S. Patent Application 2003/0075615, both to Saddoughi, both of which are hereby incorporated by reference in their entirety.

Figure 5:
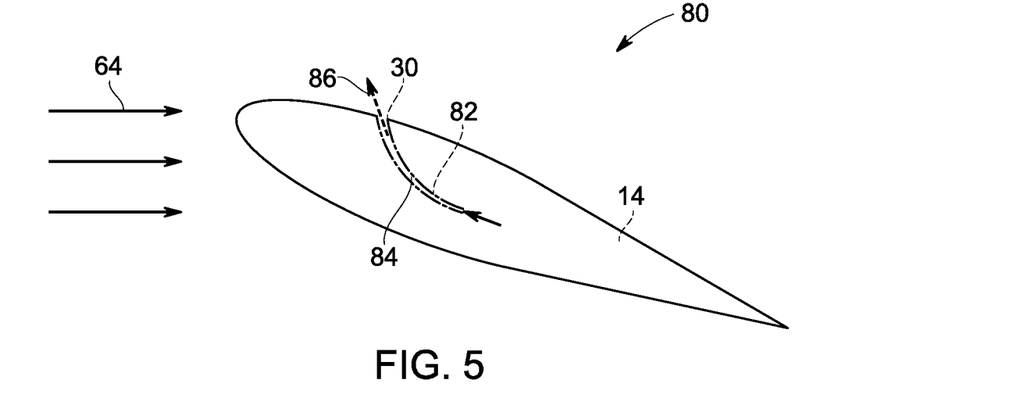
FIG. 5 is a cross-sectional view of a blade including an active flow control system for providing a steady jet flow of a pressurized fluid as a secondary fluid flow according to an exemplary embodiment.

The active flow control device 58 may include other pressurized fluid sources, such as a centralized blowing source that is not located in the blade, but in fluid communication with openings located in the blade through ductwork. FIG. 5 illustrates an exemplary embodiment of a blade design 80 including a steady blowing active flow control device 82 that can be used to accommodate a centralized blowing source that can facilitate active circulation control. In this embodiment, the opening 30 of the blade 14 is in fluid communication with a duct 84 that is in fluid communication with the centralized pulsed blowing source (not shown). The opening 30 is generally in communication with the duct 84 along its entire length through a passage such that fluid may flow within the duct 84 out of the entire length of the opening 30 adjacent the leading edge 46 of the blade 14. The centralized pulsed blowing source may be used to generate a steady blowing fluid flow 86, and consequently, active circulation control through the opening 30. The centralized blowing source can be located inside the blade or remotely with respect to the blade. The term "remotely" means that the centralized blowing source is located outside the blade and is not in physical contact with the blade. For example, in an airplane, the centralized blowing source can be located in the fuselage. Similarly, in a wind turbine, the centralized blowing source can be located on the support structure of the wind turbine. More particularly, in one embodiment, the duct 94 is in fluid communication with a centralized blowing source that is located exterior (i.e., remote) to the blade 14. In another embodiment, if the blade is large enough (e.g., a large wind turbine blade), the centralized blowing source can be located in the blade 14. In an embodiment, the opening 30 may be blocked and fluid may be pumped into the duct 84 such that pressure is built up within the duct 84. The opening 30 may then be opened such that the air flows out of the opening 30.

Figure 6:
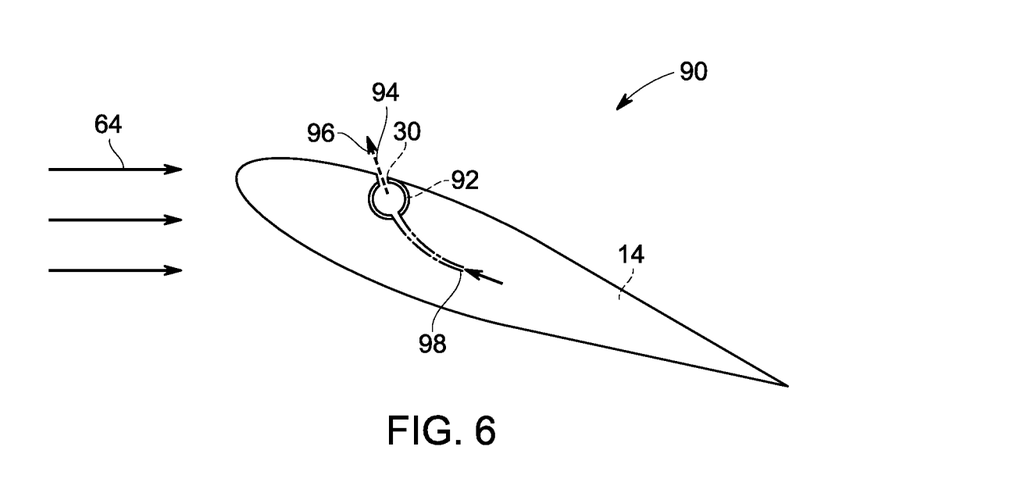
FIG. 6 is a cross-sectional view of a blade including an active flow control system for providing a pulsed jet flow as a secondary fluid flow according to an exemplary embodiment.

In yet another embodiment of a blade design 90 and as illustrated in schematic cross-section in FIG. 6, a centralized blowing source may be used generate a steady source of pressurized fluid while the pulsing of the fluid is generated by an auxiliary device such as a synthetic jet active flow control device. In the illustrated embodiment, the active flow control device includes a dual bimorph synthetic jet actuator (DBSJ) 92 and a pulsating jet 94 in fluid communication with a duct 98 that is in fluid communication with the centralized pulsed blowing source (not shown). The synthetic jet actuator (DBSJ) 92 and the pulsating jet 94 provide a pulsating jet of fluid 96 into the main incoming primary air flow 64 for active circulation control of the blades 14. The centralized pulsed blowing source may be used to generate a steady blowing fluid flow while the synthetic jet active flow control device provides for pulsing of the fluid at the wall-jet, or opening 30.

The use of active flow control devices on the blade 14 can also be described in terms of at least two different classes of embodiments—one related to operational scenarios and the other to design scenarios. Focusing on the first class of embodiments, appropriate response strategies can be generated to various operating conditions, resulting in change in momentum of the secondary fluid flow and active flow circulation conditions to achieve either lift enhancement or lift destruction. In these embodiments, active flow control instructions are provided in response to different operating conditions, such as high angles of attack or high flow conditions, to provide manipulation of the momentum of the secondary fluid flow. Examples of such flow control instructions include modifying the velocity of the pulsed jets, modifying a frequency of introducing the pulsed jets, selectively activating available active circulation control devices on the blade surface, or the like, or combinations thereof.

The second class of embodiments covers "design" scenarios, which encompass modifications to the design characteristics of the active circulation control system. Examples of such changes in design characteristics include the location of the active flow control devices on the blade surface, the angle of the fluid jet, (either the entire jet, the openings through which the fluid is injected, or combinations thereof), the size or shape of the jet exits (holes or openings), the change in shape of the blade cross-section to take advantage of the active fluid flow devices, or the like, or combinations thereof.

Figure 7:
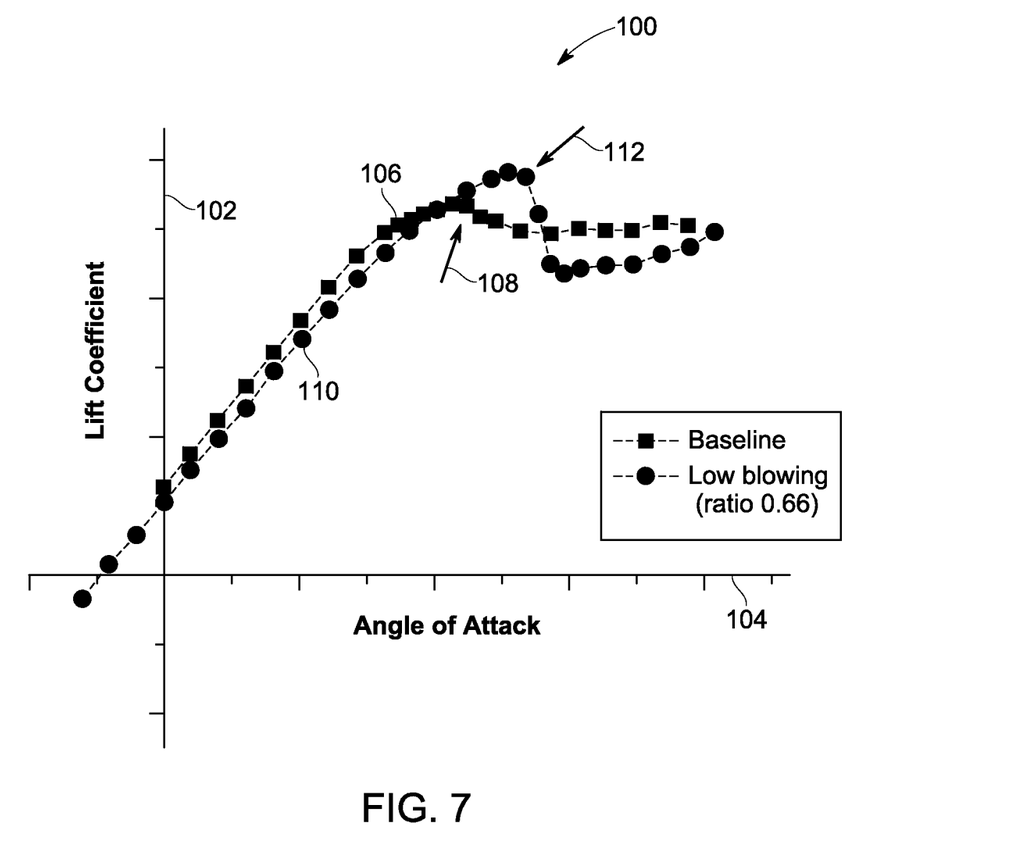
FIG. 7 is an exemplary graphical representation illustrating the effect of a steady blowing jet on the lift coefficient and delay in stall as it relates to the angle of attack of an airfoil using an active flow control system according to an exemplary embodiment.

FIG. 7 is an exemplary graphical representation 100 illustrating the effect of a steady blowing jet on the lift coefficient (plotted on axis 102) and delay in stall as it relates to the angle of attack (plotted on axis 104) of an airfoil using an active flow control system according to an exemplary embodiment. More specifically, referring again to FIG. 7, illustrated is a resultant delay in stall and increase in maximum lift as a result of a steady blowing fluid flow having a small momentum injected in an upstream direction and more particularly, in a direction substantially opposed to the direction of the incoming primary fluid flow, such as incoming primary fluid flow 64 of FIGS. 2-6. In baseline measurements (shown by plotted points/line 106), as the angle of attack increases the lift coefficient increases to a maximum lift coefficient and stall at point 108. Under the influence of a steady blowing active flow device (shown by plotted points/line 110), as the angle of attack increases the lift coefficient increases to an increased maximum lift coefficient and delay in stall at point 112.

Figure 8:
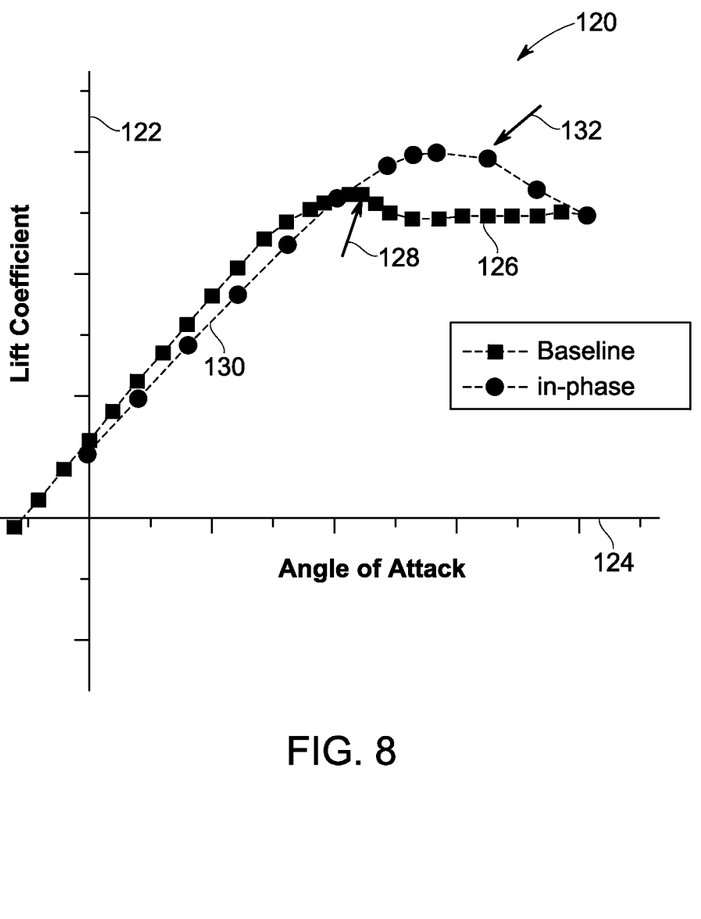
FIG. 8 is an exemplary graphical representation illustrating the effect of a steady blowing jet on the lift coefficient and delay in stall as it relates to the angle of attack of an airfoil using an active flow control system according to an exemplary embodiment.

FIG. 8 is an exemplary graphical representation 120 illustrating the effect of a steady blowing jet on the lift coefficient (plotted on axis 122) and delay in stall as it relates to the angle of attack (plotted on axis 124) of an airfoil using an active flow control system, and in particular a dual bimorph synthetic jet (DBSJ) according to an exemplary embodiment. More specifically, referring again to FIG. 8, illustrated is a resultant delay in stall and increase in maximum lift as a result of a steady blowing fluid flow having a small momentum injected in an upstream direction and more particularly, in a direction substantially opposed to the direction of the incoming primary fluid flow, such as incoming primary fluid flow 64 of FIGS. 2-6. In baseline measurements (shown by plotted points/line 126), as the angle of attack increases the lift coefficient increases to a maximum lift coefficient and stall at point 128. Under the influence of a steady blowing active flow device (shown by plotted points/line 130), as the angle of attack increases the lift coefficient increases to an increased maximum lift coefficient and delay in stall at point 132.

Thus from the above examples, it may be seen that for low blowing ratio of the steady blowing and for low power output of the oscillatory operation of DBJS, extension of stall is achieved by active control blowing in an upstream direction at full scale wind turbine Reynolds number of 4000,000.

Figure 9:
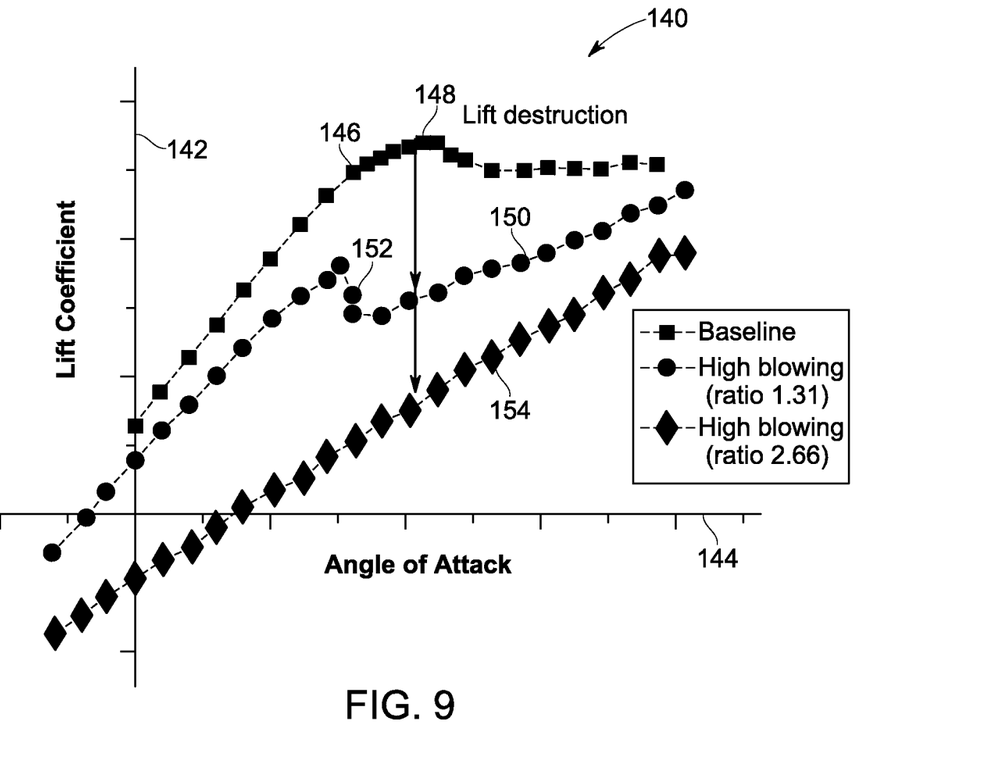
FIG. 9 is an exemplary graphical representation illustrating the effect of a steady blowing jet on the lift coefficient and lift destruction as it relates to the angle of attack of an airfoil using an active flow control system according to an exemplary embodiment.

FIG. 9 is an exemplary graphical representation 140 illustrating the effect of a steady blowing fluid flow on the lift coefficient (plotted on axis 142) and resulting lift destruction as it relates to the angle of attack (plotted on axis 144) of an airfoil using an active flow control system according to an exemplary embodiment. More specifically, referring again to FIG. 9, illustrated is a resultant destruction of lift which induces stall and reduces maximum lift as a result of a steady blowing fluid flow having a high momentum that is injected in an upstream direction and more particularly, in a direction substantially opposed to the direction of the incoming primary fluid flow, such as incoming primary fluid flow 64 of FIGS. 2-6. In baseline measurements (shown by plotted points/line 146), as the angle of attack increases the lift coefficient increases to a maximum lift coefficient and stall at point 148. Under the influence of a steady blowing active flow device at a ratio of 1.31 (large momentum) (shown by plotted points/line 150), as the angle of attack increases, the lift coefficient increases to an increased maximum lift coefficient and induced stall at point 152, thereby providing lift destruction. Under the influence of a steady blowing active flow device at a ratio of 2.66 (larger momentum than plotted points 150) (shown by plotted points/line 154), as the angle of attack increases the lift coefficient increases to an increased maximum lift coefficient and an even greater destruction of lift and resultant earlier stall.

Thus from the above example, it may be seen that for high blowing ratios of the steady blowing significant lift destruction is achieved at all angles of attack by active control blowing in upstream direction at full scale wind turbine Reynolds number of 4000,000.

Figure 10:
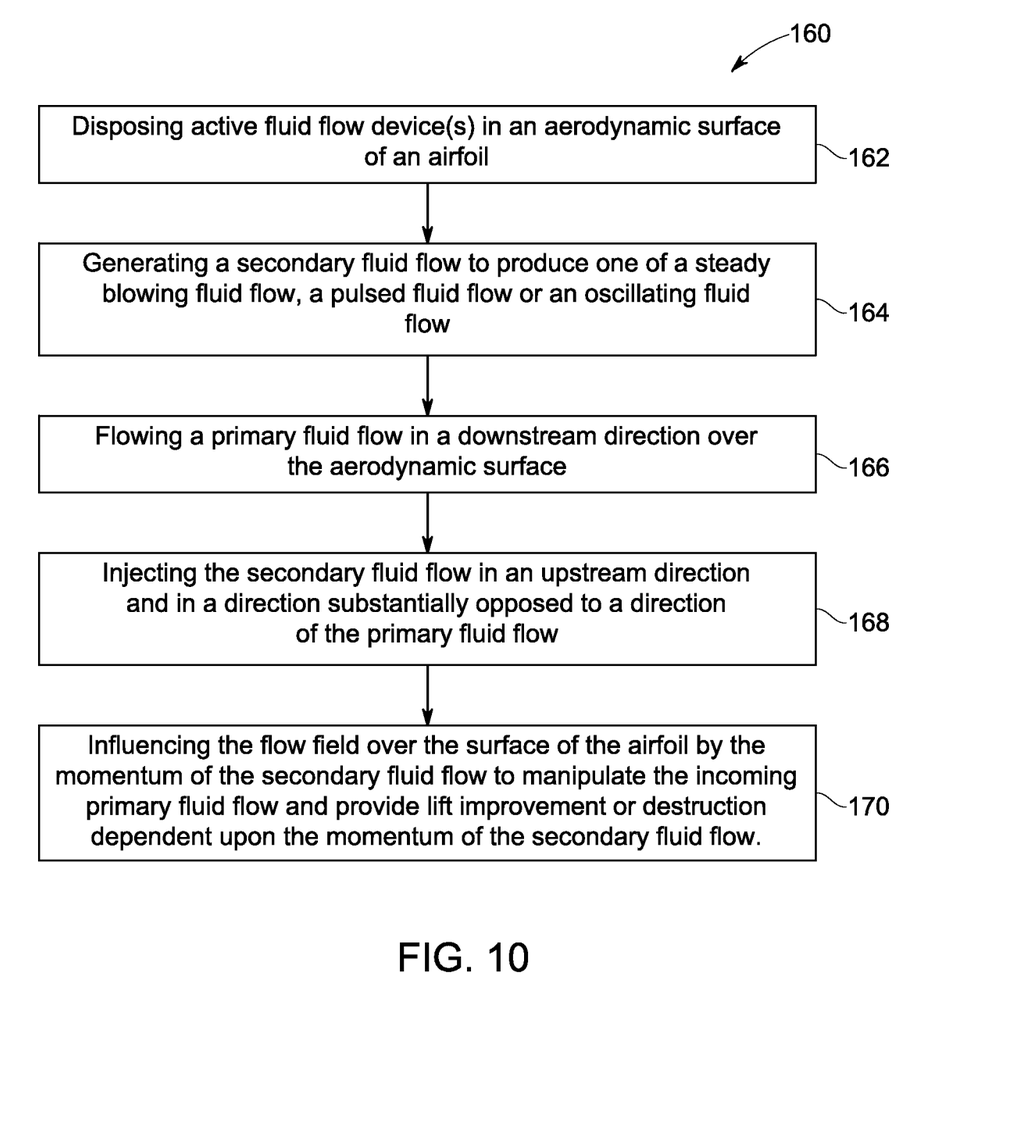
FIG. 10 is a schematic block diagram of method of using an active flow control system for lift enhancement and destruction according to an exemplary embodiment.

FIG. 10 is a schematic logic flow diagram 160 illustrating a method of using an active flow control system for lift enhancement and destruction according to an exemplary embodiment. Generally, the method involves disposing active fluid flow device(s) in an aerodynamic surface of an airfoil, at step 162. Next, in step 164 a secondary fluid flow is generated to produce one of a steady blowing fluid flow, a pulsed fluid flow or an oscillating fluid flow. In step 166, an incoming primary fluid flow is flowed in a downstream direction over the aerodynamic surface. In step 168, the secondary fluid flow is injected in an upstream direction and more particularly, in a direction substantially opposed to the direction of the incoming primary fluid flow, the fluid flow having a momentum dependent upon operation conditions. In step 170, the flow field over the surface of the airfoil is influenced by the momentum of the secondary fluid flow to manipulate the incoming primary fluid flow and provide lift improvement or destruction dependent upon the momentum of the secondary fluid flow.

The active flow control system and method of the disclosure that provides a single system capable of both lift enhancement and destruction that may be used in a variety of different aerodynamic structures. For example, wind turbine blades, compressor blades. As noted above, the use of active circulation control as provided herein is advantageous in that it permits control of lift parameters at high angles of attack and in variable and disruptive wind load environments. A controller provided in the active flow control system controls the active flow control devices in either an activated or inactivated state upon detecting a change in incident wind velocity or angle of attack that might increase system loads to undesirable levels.

The ability to mitigate system loads effectively by using active circulation control to provide reduced aerodynamic loading when needed permits operation at higher angles of attack, improved maneuverability, the use of large rotor diameters, with the ability to extract more power from larger blade sizes, higher annual energy production, improved load control, improved hardware life and reliability. The active flow control system and active flow devices disclosed herein may include additional benefits due to fast response times, size being small and lightweight and low power consumption.

As disclosed herein, a method of achieving active circulation control in an aerodynamic structure, such as a blade, utilizing an active flow control system that includes the ability to add or subtract momentum at a position that is proximate to the leading edge of the blade has been described. Active circulation control is defined as control and modification of the aerodynamic behavior of the blade achieved by using either lift enhancement, created by the addition of an upstream secondary fluid flow having a smaller momentum than an incoming primary fluid flow (and consequent vorticity production) or lift destruction, created by the addition of an upstream secondary fluid flow having a larger momentum than the incoming primary fluid flow to create a flow blockage. The blades can be used in power generation and propulsion systems as well as aerospace vehicles.

The injection of the secondary fluid flow and resultant lift enhancement or destruction is created by the injection of fluid either from active flow control devices using synthetic jets, pressurized fluid sources, or a combination of the two. These active flow control devices may be termed steady or unsteady sources dependent upon how the fluid is injected into the incoming primary fluid flow in a steady blowing air flow or a time-varying fashion at a selected frequency.

The method disclosed herein can be advantageously used to enhance the aerodynamic performance of an aerodynamic structure, such as a blade. It can also be used to improve the aerodynamic performance of blades whose shapes have been tailored or optimized to achieve improved structural and/or load-bearing performance. It can also be advantageously used to degrade the aerodynamic loading and lifting performance of the blade in order to preserve the structural integrity of the blade if so desired.

The method can also be used for improving the aerodynamic performance of non-conventional blades that have larger cross-sectional areas (than comparative conventional blades) and that are generally inefficient at generating lift by themselves. Alternatively, the method can be used to control the aerodynamic performance of the blade in accordance with the demands of the system. In one embodiment, the active flow control devices can be turned off to reduce lift on wind turbine blades and hence reduce loads on the blade during a storm. In another embodiment, the active flow control devices can be activated in a manner so as to effectively reduce lift or flow turning during operations that are conducted under conditions that the blade has not been hitherto designed for.

As described above, in one exemplary embodiment, the sources of the added momentum are localized zero mass flow actuators (e.g., synthetic jets) or other active flow control actuators that do not require piping, ductwork and sources of pressurized fluid such as pumps, or the like. These active flow control devices are light-weight, are generally located in the blade, and are integrated into the blade structure. They are designed to add momentum and emit an oscillatory fluid flow at a controlled velocity (or momentum) and frequencies to add unsteady lift. Examples of such devices include piezoelectric synthetic jets (such as dual bimorph synthetic jet (DBSJ) devices), plasma-driven actuators, electromechanically driven actuators, or the like.

In another exemplary embodiment, a pulsed fluid flow may be provided by centralized pulsed blowing sources that are not located in the blade, but instead are in fluid communication with openings located in the blade through ductwork. The unsteadiness in the fluid can be created and controlled at the source (e.g., by using an oscillating pump) or can be introduced via actuator, such as localized zero mass flow actuators (e.g., synthetic jets) or other active flow control actuators. The pulsed or oscillatory fluid of a selected strength is injected into the incoming primary fluid flow at a specific angle, preferably injected in an upstream direction and more particularly, in a direction substantially opposed to the direction of the incoming primary fluid flow, and at a selected frequency to produce active circulation control In another exemplary embodiment, a steady blowing fluid flow may be provided by centralized steady fluid blowing source or sources that are not located in the blade, but instead are in fluid communication with openings located in the blade through ductwork.

In an exemplary embodiment, the method of active circulation control can be used to generate new blade designs where the blade is strengthened against such unpredictable loads by increasing the cross-sectional thickness of the blade or by changing the shape of the blade to a less aerodynamically optimized shape (e.g., an ellipse) but to one that's better suited for handling the aforementioned loads. Here, the active circulation control method is used to generate the desired aerodynamic performance and is controllable when such aerodynamic performance is not desired.

It is to be noted that the fluid used to obtain active circulation control can be air, water, steam, or any other fluid that can be used for providing blades with lift, depending on the fluid medium in which the blade operates.

While the present disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out the disclosure. It is, therefore, to be understood that the appended claims are intended to cover all such modifications and changes as fall within the true spirit of the disclosure.

The invention claimed is:

1. A method of manipulating a primary fluid flow over a surface of a wind turbine blade, the method comprising:
   disposing a plurality of active fluid flow devices in an opening of the surface of the wind turbine blade, the opening extending substantially along an entire length of a span of the wind turbine blade to accommodate the plurality of active flow control devices;
   operating the plurality of active fluid flow devices to generate at least one of a steady blowing secondary fluid flow, a pulsed secondary fluid flow or an oscillating secondary fluid flow;
   flowing the primary fluid over the surface to create a primary flow field and provide a lift force;
   injecting the secondary fluid flow in a direction substantially opposed to a direction of the primary fluid flow to capture energy from the primary fluid flowing through a desired and controllable length of the span of the wind turbine blade; and
   influencing the primary flow field by manipulating a momentum of the secondary fluid flow to influence the incoming primary fluid flow and the lift force.

2. The method of claim 1, wherein the step of disposing a plurality of active fluid flow devices in the surface includes disposing the plurality of active fluid flow devices in the opening in the surface at a distance of up to about 50% of the length of a chord of the wind turbine blade measured from a leading edge of the surface.

3. The method of claim 1, wherein the step of influencing the flow field by manipulating a momentum of the secondary fluid flow includes adjusting operating parameters including voltage and frequency of each of the plurality of active fluid flow devices.

4. The method of claim 3, wherein the step of influencing the flow field by manipulating a momentum of the secondary fluid flow includes manipulating the momentum to effect a flow blockage of the primary flow field and provide lift destruction.

5. The method of claim 3, wherein the step of influencing the flow field by manipulating a momentum of the secondary fluid flow includes manipulating the momentum to effect mixing of the secondary fluid flow with the primary flow field and provide lift enhancement.

6. The method of claim 1, wherein the plurality of active fluid flow devices include a plurality of synthetic jets, operable to produce the oscillatory secondary fluid flow at the opening.

7. The method of claim 6, wherein the plurality of synthetic jets are dual bimorph synthetic jets.

8. The method of claim 1, wherein the plurality of active fluid flow devices include a steady blowing pressurized fluid source.

9. The method of claim 8, wherein the steady blowing pressurized fluid source is operable to produce the steady blowing secondary fluid flow at the opening.

10. The method of claim 8, wherein the steady blowing pressurized fluid source is coupled to a pulsed jet and operable to produce the pulsed secondary fluid flow at the opening.

11. A method of operating an active flow control system operable to manipulate a primary fluid flow over an aerodynamic surface of a wind turbine, wherein the method comprises:
   disposing a plurality of active flow devices in an opening in the aerodynamic surface, the opening extending substantially along an entire length of a span of the wind turbine blade to accommodate the plurality of active flow control devices, the plurality of active flow devices located substantially downstream of the primary fluid flow over the aerodynamic surface of the wind turbine and operable to introduce at least one secondary flow in the near wall boundary layer as one of a series of wall-jets or a vortex sheet emitted through the opening;
   operating the plurality of active fluid flow devices to generate at least one of a steady blowing secondary fluid flow, a pulsed secondary fluid flow or an oscillating secondary fluid flow at an opening in the aerodynamic surface of the wind turbine;
   flowing the primary fluid over the aerodynamic surface of the wind turbine to create a primary flow field and provide a lift force;
   injecting the secondary fluid flow in a direction substantially opposed to a direction of the primary fluid flow to capture energy from the primary fluid flowing through a desired and controllable length of the span of the wind turbine blade; and
   influencing the primary flow field by manipulating a momentum of the secondary fluid flow to influence the incoming primary fluid flow and the lift force.

12. The method of claim 11, wherein the step of influencing the flow field by manipulating a momentum of the secondary fluid flow includes adjusting operating parameters including voltage and frequency of each of the plurality of active fluid flow devices.

13. The method of claim 12, wherein the plurality of active fluid flow devices are operable to produce the secondary fluid flow having a momentum sufficient to effect a flow blockage of the primary flow field to provide lift destruction and to effect mixing of the secondary fluid flow with the primary flow field and provide lift enhancement.

14. The method of claim 11, wherein the plurality of active fluid flow devices include one of a plurality of synthetic jets, a steady blowing pressurized fluid source, or a combination of a plurality of synthetic jets and a steady blowing fluid source.

15. The method of claim 14, wherein the plurality of synthetic jets are dual bimorph synthetic jets operable to produce the oscillatory secondary fluid flow at the opening.

16. The method of claim 11, wherein the steady blowing pressurized fluid source is operable to produce the steady blowing secondary fluid flow at the opening.

17. The method of claim 11, wherein the steady blowing pressurized fluid source is coupled to a pulsed jet and operable to produce the pulsed secondary fluid flow at the opening.

18. The method of claim 11, wherein the aerodynamic surface is an airfoil surface of the wind turbine.

19. The method of claim 18, wherein the plurality of active fluid flow devices include one of a plurality of synthetic jets, a steady blowing pressurized fluid source, or a combination of a plurality of synthetic jets and a steady blowing fluid source.

20. A method of operating an active flow control system operable to manipulate a primary fluid flow over a surface of a wind turbine blade, wherein the method comprises:

disposing a plurality of active flow devices in an opening of the surface of the wind turbine blade located substantially downstream of the primary fluid flow over the surface of the wind turbine blade, the opening extending substantially along an entire length of a span of the wind turbine blade to accommodate the plurality of active flow control devices, the plurality of active flow devices operable to introduce at least one secondary flow in the near wall boundary layer as a series of wall-jets or a vortex sheet emitted through the opening;

operating the plurality of active fluid flow devices to generate at least one of a steady blowing secondary fluid flow, a pulsed secondary fluid flow or an oscillating secondary fluid flow at an opening in the surface of the wind turbine blade;

flowing the primary fluid over the surface of the wind turbine blade to create a primary flow field and provide a lift force;

injecting the secondary fluid flow in a direction substantially opposed to a direction of the primary fluid flow to capture energy from the primary fluid flowing through a desired and controllable length of the span of the wind turbine blade; and influencing the primary flow field by adjusting operating parameters including voltage and frequency of each of the plurality active fluid flow devices thereby manipulating a momentum of the secondary fluid flow to influence the incoming primary fluid flow and provide lift enhancement or lift destruction to the lift force.

* * * * *